(12) United States Patent
Dent

(10) Patent No.: US 6,400,926 B1
(45) Date of Patent: Jun. 4, 2002

(54) RADIOCOMMUNICATION SYSTEM USING GEOSTATIONARY AND NON-GEOSTATIONARY SATELLITES

(75) Inventor: Paul W. Dent, Stehags (SE)

(73) Assignee: Ericsson GE Mobile Communications Inc., Research Triangle Park, NC (US)

( * ) Notice: Subject to any disclaimer, the term of this patent is extended or adjusted under 35 U.S.C. 154(b) by 0 days.

(21) Appl. No.: 08/263,835

(22) Filed: Jun. 22, 1994

(51) Int. Cl.$^7$ .............................................. H04B 7/185
(52) U.S. Cl. ..................... 455/13.1; 455/12.1; 455/428; 455/453
(58) Field of Search ............................... 455/12.1, 13.1, 455/13.2, 8, 427, 428, 429, 430, 453; 342/352, 354; 244/158 R

(56) References Cited

U.S. PATENT DOCUMENTS

| | | | |
|---|---|---|---|
| 3,340,531 A | * 9/1967 | Kefalas | 455/13.1 |
| 3,917,998 A | 11/1975 | Welti | |
| 4,502,051 A | * 2/1985 | Dondl | 455/13.1 |
| 4,809,935 A | 3/1989 | Draim | 244/158 R |
| 4,943,808 A | 7/1990 | Dulck et al. | |
| 4,985,706 A | 1/1991 | Schukat | |
| 5,081,703 A | * 1/1992 | Lee | 455/13.2 |
| 5,119,225 A | * 6/1992 | Grant et al. | 455/12.1 X |
| 5,319,673 A | * 6/1994 | Briskman | 455/13.1 |
| 5,433,726 A | * 7/1995 | Horstein et al. | 455/12.1 |
| 5,589,834 A | * 12/1996 | Weinberg | 342/354 |
| 5,625,867 A | * 4/1997 | Rouffet et al. | 455/428 X |

FOREIGN PATENT DOCUMENTS

| | | |
|---|---|---|
| EP | 017597 | 10/1980 |
| EP | 233563 | 8/1987 |
| EP | 507688 | 10/1992 |
| EP | 536921 | 4/1993 |
| WO | WO88/04866 | 6/1988 |

OTHER PUBLICATIONS

A.H. Ballard; IEEE Transactions on Aerospace and Electronic Systems, vol. 16, No. 5; Sep. 1980; 'Rosette Constellations of Earth Satellites'.*
Luck, "System Organization for General Communication via Medium Altitude Satellites", RCA Review, pp. 293–324, Sep. 1963.*
Benedicto et al., "MAGSS-14: A Medium-Altitude Global Satellite System for Personal Communications at L-Band", Radiofrequency Systems Division ESTEC, pp. 1–17, Jun. 1992.*
Kachmar, M. "Land Mobile Satellites Pick Up Where Cellular Radio Leaves Off", Microwaves and RF, pp. 33–35, Aug. 1994.*
"Bird Watching", Dan Sweeney, *Cellular Business*, pp. 23–46, Jul. 1993.

* cited by examiner

*Primary Examiner*—William Trost
*Assistant Examiner*—Philip J. Sobutka
(74) *Attorney, Agent, or Firm*—Myers Bigel Sibley & Sajovec

(57) ABSTRACT

A radiocommunication system and method using a combination of a geostationary (GEO) and a plurality of medium earth orbit (MEO) satellites are disclosed. First, a GEO satellite is launched to provide initial system capacity. Next, MEO satellites are successively launched into positions where they can supplement the coverage of the GEO satellite during peak traffic hours. Finally, when a sufficient number of MEO satellites are in place, the GEO satellite can provide the supplementary capacity.

10 Claims, 2 Drawing Sheets

RADIOCOMMUNICATION SYSTEM USING GEOSTATIONARY AND NON-GEOSTATIONARY SATELLITES

BACKGROUND

The present invention generally relates to methods and systems for providing radiocommunications and, more particularly, to such methods and systems which use satellites to provide radiocommunications.

In the past, satellite systems for providing global coverage have been of one of three types, broadly classifiable by orbiting distance into geostationary (GEO), low earth orbit (LEO) and medium earth orbit (MEO). An example of a geostationary satellite communications system is the INMARSAT system (International Maritime Satellite Organization). One advantage of geostationary satellites is that they remain in a fixed position relative to the earth, and only four such satellites are required to illuminate the entire earth. A disadvantage of geostationary satellites is that they are very distant, needing high transmit power and large antennas to provide communications capacity and incurring about a ¼ second, round-trip, signal propagation delay.

An example of a LEO system is the IRIDIUM system proposed by Motorola. An advantage of LEO systems is that the satellites are much closer to the earth, thereby providing improved communications. Since the satellites are closer to the earth, less transmitting power is needed for both the satellite and an individual user's transceiver. A disadvantage is that about 70 satellites are required to give 24 hour coverage to most points on the globe. Moreover, satellites in low earth orbits move quite rapidly relative to the earth, thereby causing high Doppler shifts and frequent handovers of communication from one satellite to the next.

An example of the compromise MEO system is the ODYSSEY satellite system proposed by TRW. The orbital altitude of MEO satellites lies between the GEO and LEO orbits, providing better communication quality than a GEO system, with less movement and Doppler shift than an LEO system. Moreover, MEO systems provide more or less 24 hour coverage to most points on the globe using between 8 and 18 satellites which is much less expensive than the about 70 satellite LEO solution.

While the MEO solution represents a good compromise between conflicting requirements, it suffers from a practical disadvantage that almost all satellites must be in place before coverage is sufficient (in percentage of time available) to be considered attractive to subscribers. This lesson was learned from the GPS satellite navigation system, which is also a MEO solution. Thus, a considerable investment spanning a multi-year program is needed before significant revenue can be expected when implementing a MEO system.

Accordingly, it would be desirable to provide radiocommunication systems and methods which overcome the foregoing drawbacks of conventional LEO, MEO and GEO solutions.

SUMMARY

According to exemplary embodiments of the present invention a hybrid GEO/MEO solution begins life with the launch of a geostationary satellite that provides radiocommunication coverage to a region of major expected traffic growth, but has a limited capacity which is sufficient to support only an initial number of subscribers. This is followed by the successive launch of a number of MEO satellites. The MEO satellites can, initially, supplement the coverage of the geostationary satellite. Later, once sufficient MEO satellites are in orbit, the primary traffic burden can be relegated to the MEO satellites, with the GEO satellite performing a supplementary role. Finally, if desired, enough MEO satellites can be launched to provide all of the desired system capacity.

In this way, a major drawback of MEO systems, specifically the lengthy period between initial launching and sufficient capacity to reach profitability, is overcome since systems according to the present invention provide instant capacity by first launching a geostationary satellite.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
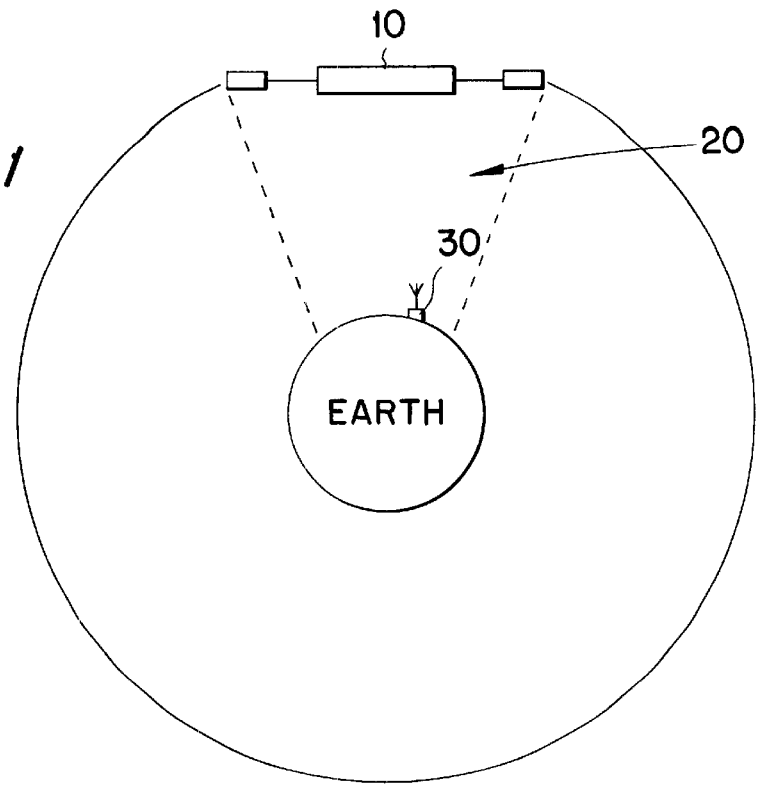
FIG. 1 illustrates a geostationary satellite orbiting the earth according to the present invention.

According to the present invention, FIG. 1 shows a first satellite 10 which will be established in a geostationary orbit to provide the initial capacity of the system. Although limited in its capacity, this geostationary satellite 10 can provide sufficient capacity to serve a limited number of subscribers within a predefined geographical coverage or traffic area 20. Thus, for example, if a terminal unit 30 remains within the geographical coverage area 20 and is one of the limited number of subscribers served by geostationary satellite 10, the terminal unit 30 would expect to receive good service except, perhaps, at peak usage times.

Figure 2:
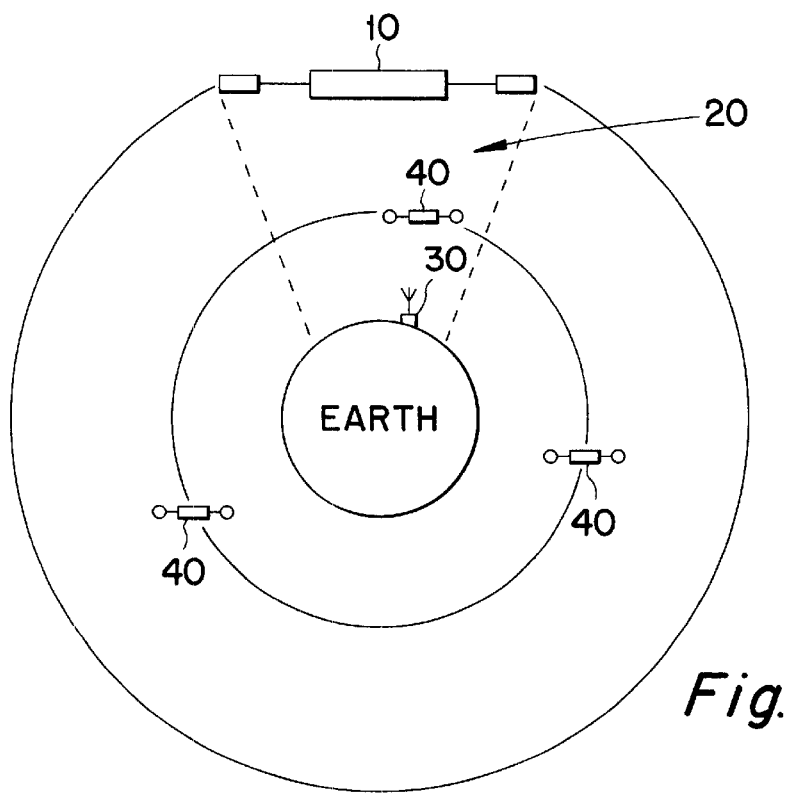
FIG. 2 illustrates a geostationary satellite and several medium earth orbit satellites according to another exemplary embodiment of the present invention.

During a second phase of system development, successive satellites 40 can be launched into a medium earth orbit as seen in FIG. 2. For example, such an orbit could be a so-called harmonically synchronous orbit whereby the satellite orbits the earth an integral number of times in one sidereal day such that the ground track repeats. For example, an orbital radius of 16756 km (orbital height 10386 km) gives 4 orbits per sidereal day. Note that each of the medium earth orbit satellites 40 could have greater nominal capacity than the geostationary satellite 10 due to their relative proximity. Of course, a single medium earth orbit satellite 40 will not cover any region on the earth for more than a fraction of a day, for example, for two hours once per day, but this coverage can be chosen to occur at a peak traffic period in the day at least one major traffic location, and thus supplement the limited capacity of the GEO satellite allowing the number of subscribers to be expanded.

One desirable characteristic of exemplary embodiments according to the present invention is that the modulation and multiple access method (e.g., FDMA, TDMA, CDMA or hybrid thereof) used for two-way exchange of radio signals between a terminal unit and the satellites be the same regardless of whether the geostationary or medium earth orbit satellites are accessed. It is also desirable that the MEO satellite orbital period be a submultiple of a day such that it repeatedly overflies the chosen service area at the designated peak traffic period.

As more MEO satellites 40 are launched, more and more of the global traffic from a continuously expanding subscriber base will be taken by the MEO satellites. Ultimately, if enough MEO satellites are launched, the GEO satellite 10 can be dispensed with. However, the number of MEO satellites 40 required to provide coverage 100% of the time at 100% of locations is significantly greater than if these percentages are relaxed, particularly when secondary criteria are added, such as a mobile-satellite angle of elevation greater than 20 degrees, or visibility of two satellites from every mobile phone for at least 90% of the time, to provide diversity reception.

Figure 3:
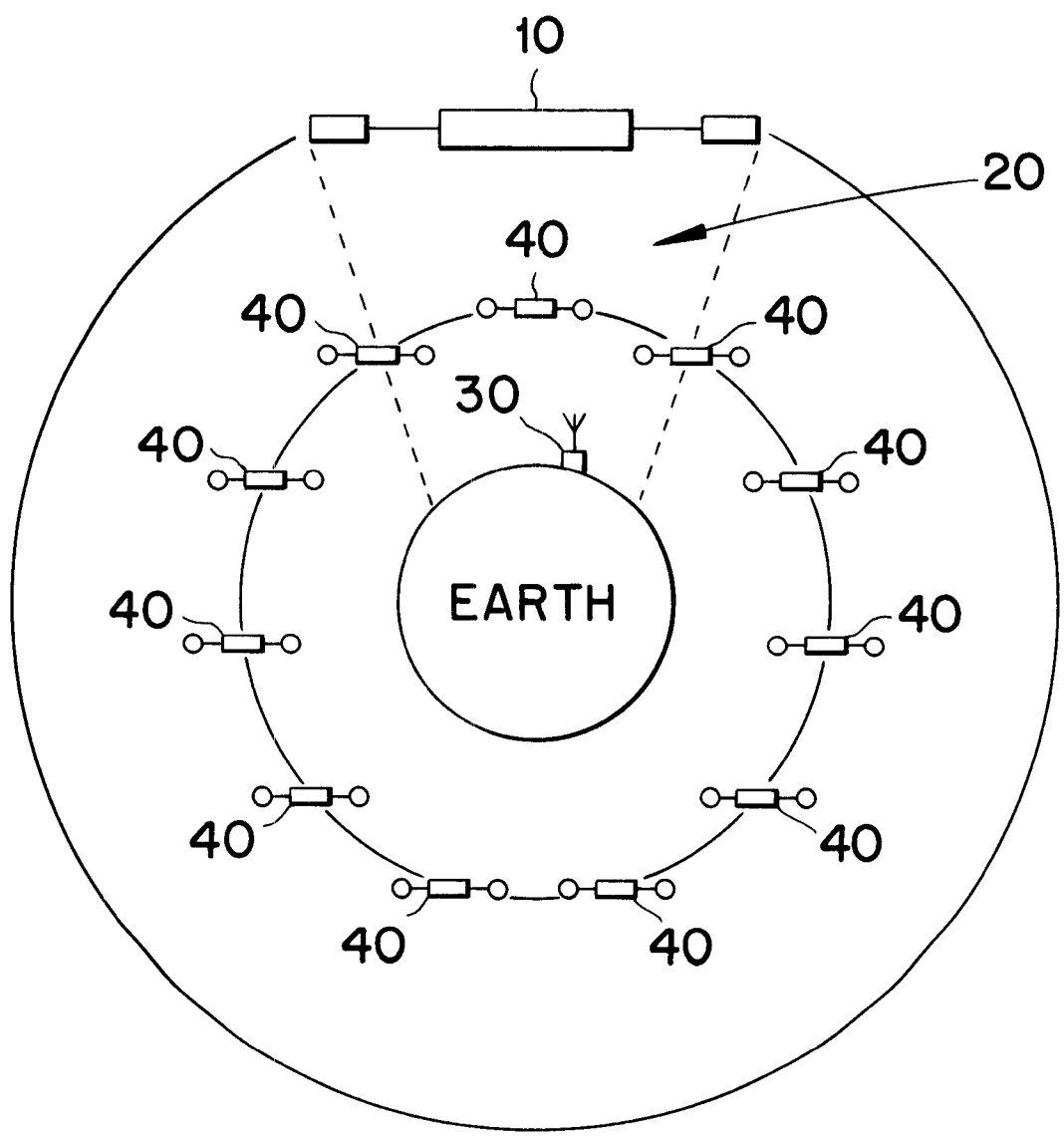
FIG. 3 shows a geostationary satellite and many medium earth orbit satellites according to an exemplary embodiment.

When a greater number of MEO satellites have been launched, as shown in FIG. 3, there will still be "holes" in the coverage where the secondary criteria are not met at particular locations for some of the time. According to the present invention, the geostationary satellite or satellites are maintained in operation in this phase in order to fill in the holes, thus allowing the secondary criteria to be met with a smaller final number of MEO satellites 40.

It can be seen that the originally launched geostationary satellite 10 has a different role in three different program phases:

PHASE 1: The geostationary satellite alone provides service to a limited initial subscriber base.

PHASE 2: The geostationary satellite has its capacity supplemented at peak traffic periods by one or more MEO satellites.

PHASE 3: The geostationary satellite "fills in" for the holes in the coverage provided by a limited constellation of MEO satellites.

In order to operate effectively in all three roles, the geostationary satellite 10 should possess certain characteristics. In particular, to fulfill its phase 3 role, the geostationary satellite should be able to direct capacity to needy regions (e.g., the holes) by means of electronically or mechanically steered antenna beams or switched beams. An exemplary technical solution for directing such capacity would be to use a phased array satellite transponder as disclosed in U.S. patent application Ser. No. 08/179,953 to Paul W. Dent entitled "A Cellular Satellite Communications System with Improved Frequency Reuse" filed on Jan. 11, 1994 which disclosure is incorporated, in its entirety, here by reference. An alternative arrangement, however, is the multi-beam parabolic antenna system driven by a so-called matrix power amplifier, as used on current INMARSAT-III satellites, and described in U.S. Pat. No. 3,917,998 to Welti which disclosure is also incorporated here by reference. The matrix power amplifier arrangement allowing either the power of each transmit amplifier to drive an associated beam, or, with great flexibility, and on a signal-by-signal basis, the power of several power amplifier stages to be collected into a single beam, if that is where the capacity is currently most needed.

Although the present invention has been described in terms of the foregoing exemplary embodiments, these embodiments are intended to be illustrative in all respects rather than restrictive of the present invention. For example, although the foregoing exemplary embodiments have only one geostationary satellite and a plurality of medium earth orbit satellites, two or more geostationary satellites could be provided. Moreover, although it would be desirable to launch the geostationary satellite first to provide instant capacity, one or more medium earth orbit satellites could be launched before the geostationary satellite. Those skilled in the art will readily appreciate that many modifications and adaptations are contemplated by the present invention whose scope is defined by the appended claims including all equivalents thereof.

What is claimed is:

1. A satellite communications system comprising:

at least one geostationary satellite and at least one medium orbit satellite for providing radio communications to a plurality of subscriber terminals, in which the at least one geostationary satellite provides radio communications to said subscriber terminals during periods when the subscriber terminals cannot access one of said at least one medium earth orbit satellites.

2. A system according to claim 1 in which said geostationary satellite provides one of: stand alone service to subscribers, service to subscribers supplemented at peak periods by at least one medium earth orbit satellite, and service for gaps in coverage provided by said medium earth orbit satellites.

3. The system according to claim 2, wherein the service provided by said geostationary satellite is determined based on a number of medium earth orbit satellites in orbit.

4. A satellite communications system comprising:

a geostationary satellite for providing radio communication service to a plurality of subscriber terminals;

a medium orbit satellite also for providing radio communication service to said plurality of subscriber terminals;

wherein said geostationam satellite provides said radio communication service when said medium orbit satellite is not operational.

5. A system according to claim 4 further comprising:

a plurality of additional medium earth orbit satellites which become operational after said medium orbit satellite becomes operational, wherein said geostationary satellite directs its capacity to serve areas determined based on traffic and service capacity of the medium earth orbit satellites.

6. A system according to claim 4, wherein the medium earth orbit satellite supplements the radio communication service of the geostationary satellite when the medium earth orbit satellite is operational.

7. A system according to claim 6 wherein said medium orbit satellite is disposed in a position to cover at least one peak traffic area at a selected time of the day.

8. A method of providing radiocommunication to a plurality of terminal units comprising the steps of:

launching a satellite into a geostationary orbit;

providing radiocommunication service to said plurality of terminal units using only said geostationary satellite prior to launching additional satellites;

launching a plurality of satellites into a medium earth orbit; and providing radiocommunication service using both said geostationary satellite and at least one of said plurality of medium earth orbit satellites.

9. The method of claim 8 wherein said second providing step further comprises the steps of:

providing radiocommunication service using said at least one of said plurality medium earth orbit satellites to supplement said service of said geostationary satellite until a predetermined number of said medium earth orbit satellites have been launched, after which providing radiocommunication service using said geostationary satellite to supplement service of said medium earth orbit satellites.

10. A method of providing radio communication service to a plurality of subscriber terminals comprising the steps of:

launching a satellite into geostationary orbit at a first altitude and launching at least one satellite into non-geostationary orbit at a second altitude lower than said first altitude, wherein the satellite in geostationary orbit provides radio communication service to at least one of the subscriber terminals during a period that said subscriber terminal cannot access the at least one satellite in non-geostationary orbit.

\* \* \* \* \*